(12) United States Patent
Kulkarni et al.

(10) Patent No.: US 11,526,412 B2
(45) Date of Patent: *Dec. 13, 2022

(54) RESOURCE ALLOCATION TOOL

(71) Applicant: Bank of America Corporation, Charlotte, NC (US)

(72) Inventors: Aditya Kulkarni, Hyderabad (IN); Rama Venkata S. Kavali, Frisco, TX (US); Venugopala Rao Randhi, Hyderabad (IN); Lawrence Anthony D'Silva, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,251

(22) Filed: May 28, 2021

(65) Prior Publication Data

US 2021/0286690 A1    Sep. 16, 2021

Related U.S. Application Data

(63) Continuation of application No. 16/238,638, filed on Jan. 3, 2019, now Pat. No. 11,055,187.

(51) Int. Cl.
| | | |
|---|---|---|
| *G06F 11/00* | (2006.01) | |
| *G06F 11/20* | (2006.01) | |
| *G06F 9/50* | (2006.01) | |
| *G06F 9/48* | (2006.01) | |

(52) U.S. Cl.
CPC ........ *G06F 11/2033* (2013.01); *G06F 9/4881* (2013.01); *G06F 9/5038* (2013.01); *G06F 11/203* (2013.01); *G06F 11/2035* (2013.01); *G06F 2201/85* (2013.01)

(58) Field of Classification Search
CPC . G06F 11/203; G06F 11/2033; G06F 11/2035
See application file for complete search history.

(56) References Cited

U.S. PATENT DOCUMENTS

| | | |
|---|---|---|
| 7,512,702 B1 | 3/2009 | Srivastava et al. |
| 8,429,346 B1 | 4/2013 | Chen et al. |
| 8,756,480 B2 | 6/2014 | Gladwin et al. |
| 8,938,013 B2 | 1/2015 | Grube et al. |
| 9,848,044 B2 | 12/2017 | Leggette et al. |
| 9,959,076 B2 | 5/2018 | Resch |
| 10,061,650 B2 | 8/2018 | Gladwin et al. |
| 10,498,666 B2 | 12/2019 | Cui et al. |
| 11,030,159 B2 * | 6/2021 | Cometto ............... G06F 9/4411 |

(Continued)

*Primary Examiner* — Joshua P Lottich (57) ABSTRACT

A method includes receiving a plurality of data processing requests and generating a primary processing stack indicating a queue for processing the first data. The primary processing stack comprises a plurality of layers. Each layer comprises a plurality of slices, wherein each slice represents a portion of the first data of at least one data processing request. The plurality of slices are arranged within each layer based at least on the priority indicator corresponding to the first data that each slice represents. The method further includes receiving resource information about a plurality of servers, assigning each slice of the primary processing stack to one of the servers, and sending processing instructions comprising an identification of each slice of the primary processing stack assigned to the respective server.

20 Claims, 5 Drawing Sheets

(56) References Cited

U.S. PATENT DOCUMENTS

| | | |
|---|---|---|
| 2007/0022426 A1 | 1/2007 | Steinder et al. |
| 2016/0366233 A1 | 12/2016 | Le et al. |
| 2019/0045008 A1 | 2/2019 | Murthy et al. |
| 2020/0195524 A1 | 6/2020 | Clow et al. |
| 2020/0218577 A1 | 7/2020 | Kulkarni et al. |
| 2022/0022026 A1* | 1/2022 | Sharma .................. H04W 8/12 |

* cited by examiner

RESOURCE ALLOCATION TOOL

CROSS-REFERENCE TO RELATED APPLICATIONS

This application is a continuation of U.S. patent application Ser. No. 16/238,638 filed Jan. 3, 2019, by Aditya Kulkarni et al., and entitled "RESOURCE ALLOCATION TOOL," which is incorporated herein by reference.

TECHNICAL FIELD

This disclosure relates generally to managing computing resources. More specifically, this disclosure relates to a tool for allocating resources of a server.

BACKGROUND

Generally, servers process data over a network on a first-in-first-out ("FIFO") basis. Although processing data based on a receipt time is equitable, such scheme may undermine the impact and importance of individual tasks. For example, a server implementing a FIFO-processing scheme may process data received from a first person at a first time before processing data received from a second person at a time later than the first time even though the data associated with the second person is of higher priority than the data associated with the first person.

SUMMARY OF THE DISCLOSURE

According to one embodiment, a resource allocation tool includes a grouping engine, a stacking engine, and an assignment engine. The grouping engine is configured to: receive a plurality of data processing requests and assign each data processing request to one of a plurality of groups, wherein each data processing request includes: first data having a file size; an identification of a source of the first data; and a priority indicator corresponding to the first data; and each data processing request is assigned to one of the plurality of groups based on the source of the first data. The stacking engine is configured to generate a primary processing stack indicating a queue for processing the first data associated with the plurality of data processing requests, wherein: the primary processing stack comprises a plurality of layers; each layer comprises a plurality of slices, wherein each slice represents a portion of the first data of at least one data processing request; and the plurality of slices are arranged within each layer based at least on the priority indicator corresponding to the first data that each slice represents. The assignment engine is configured to: receive resource information about a plurality of servers, assign each slice of the primary processing stack to one of the servers having an operational status, and send, to each of the servers having an operational status, processing instructions comprising an identification of each slice of the primary processing stack assigned to the respective server. Each of the plurality of servers are configured to process the first data corresponding to each data processing request and the resource information includes at least an identification of each server of the plurality of servers, a status of each server of the plurality of servers, and, for each server of the plurality of servers having an operational status, a capacity of each server.

According to another embodiment, a method includes receiving a plurality of data processing requests, each data processing request including: first data having a file size; an identification of a source of the first data; and a priority indicator corresponding to the first data. The method further includes assigning each data processing request to one of a plurality of groups based on the source of the data and generating a primary processing stack indicating a queue for processing the first data associated with the plurality of data processing requests, wherein: the primary processing stack comprises a plurality of layers; each layer comprises a plurality of slices, wherein each slice represents a portion of the first data of at least one data processing request; and the plurality of slices are arranged within each layer based at least on the priority indicator corresponding to the first data that each slice represents. The method further includes receiving resource information about a plurality of servers, wherein: each of the plurality of servers are configured to process the first data corresponding to each data processing request; and the resource information includes at least an identification of each server of the plurality of servers, a status of each server of the plurality of servers, and, for each server of the plurality of servers having an operational status, a capacity of each server. The method further includes assigning each slice of the primary processing stack to one of the servers having an operational status, wherein each slice is assigned based on a presence of the slice in a particular layer of the primary processing stack and a sequence position of the slice within the particular layer, and sending, to each of the servers having an operational status, processing instructions comprising an identification of each slice of the primary processing stack assigned to the respective server.

According to another embodiment, one or more computer readable non-transitory storage media embodying software that is operable when executed to: receive a plurality of data processing requests and assign each data processing request to one of a plurality of groups wherein, each data processing request includes: first data having a file size; an identification of a source of the first data; and a priority indicator corresponding to the first data; and each data processing request is assigned to one of the plurality of groups based on the source of the data. The media is further operable when executed to generate a primary processing stack indicating a queue for processing the first data associated with the plurality of data processing requests and receive resource information about a plurality of servers. The primary processing stack includes a plurality of layers; each layer comprises a plurality of slices, each slice representing a portion of the first data of at least one data processing request; and wherein the plurality of slices are arranged within each layer based at least on the priority indicator corresponding to the first data that each slice represents. Each of the plurality of servers are configured to process the first data corresponding to each data processing request and the resource information includes at least an identification of each server of the plurality of servers, a status of each server of the plurality of servers, and, for each server of the plurality of servers having an operational status, a capacity of each server. The media is further operable when executed to assign each slice of the primary processing stack to one of the servers having an operational status, wherein each slice is assigned based on a presence of the slice in a particular layer of the primary processing stack and a sequence position of the slice within the particular layer, and send, to each of the servers having an operational status, processing instructions comprising an identification of each slice of the primary processing stack assigned to the respective server.

Certain embodiments may provide one or more technical advantages. For example, an embodiment of the present disclosure may improve the data processing capabilities of one or more servers. As another example, an embodiment of the present disclosure may permit data to be processed on the basis of priority rather than a timestamp. As yet another example, an embodiment of the present disclosure may generate a queue for processing data and, based on additional processing requests, reconfigure the data in the processing queue to accommodate one or more of the additional processing requests. As yet another example, an embodiment of the present disclosure may identify errors during data processing and reconfigure the processing queue based on the error identification. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Embodiments of the present disclosure and its advantages are best understood by referring to FIGS. 1 through 5 of the drawings, like numerals being used for like and corresponding parts of the various drawings.

Process servers that implement a first-in-first-out (FIFO) policy allocate resources based on the received time of each processing request. Generally, the first received processing request will be handled first. Although a FIFO resource allocation scheme may be beneficial in some circumstances, it may not be beneficial in all circumstances. Rather, it may be beneficial for processing requests to be handled based on factors other than a time that the processing request was received. For example, it may be beneficial for process servers to prioritize certain processing requests over other processing requests based on situational factors such as an urgency of a processing request, a status of the requesting party, or another suitable situational factor or combination of situational factors. As another example, it may be beneficial for process servers to process data associated with processing requests in portions rather than to process all the data associated with a particular processing request before processing any data associated with another processing request.

This disclosure contemplates a resource allocation tool that allocates server resources to handle data processing requests based on a priority and a data size associated with a data request. By using the resource allocation tool described herein, data may be processed in a manner that appreciates that some data is more valuable and/or imperative than other data. Generally, the resource allocation tool receives data processing requests, assigns each data processing request to a group based on the source of the data processing request, and generates a processing stack indicative of a queue for processing the data associated with the data processing requests. The generated processing stack comprises one or more layers which in turn each comprise one or more slices, each slice representing a portion of the data associated with a data processing request. Importantly, the number of layers within the processing stack is determined based on the aggregate data size of the data associated with each data processing request, the size of each slice is computed based on historical information, and the slices are arranged within each layer based on a priority indicator associated with the data being processed.

Upon generating the processing stack, the resource allocation tool assigns each slice of the processing stack to be handled by a processing server and instructs the servers as to the sequence in which to process each slice. In some cases, each processing server handles (or processes) the slices as instructed by the resource allocation tool. In other cases, the resource allocation tool may intervene with the processing of the processing stack and reassign slices based on a subsequently generated processing stack. The latter case may occur, for example, when the resource allocation tool receives subsequent data processing requests indicating a high priority. Accordingly, the resource allocation tool may generate a secondary processing stack comprising the data associated with the subsequent data processing request and the leftover data needing to be processed from the original processing stack. The latter case may also occur when the resource allocation tool determines that a process server is not able to process a particular slice of a processing stack. In such case, the resource allocation tool may reassign the slice to another process server, generate a new processing stack comprising the leftover data needing to be processed from the original processing stack, and assign the slices of the new processing stack to process servers other than the process server that was not able to process the slice of the original stack. By dynamically updating processing stacks as described herein, data may be processed in a manner that is aligned with organizational goals.

Figure 1:
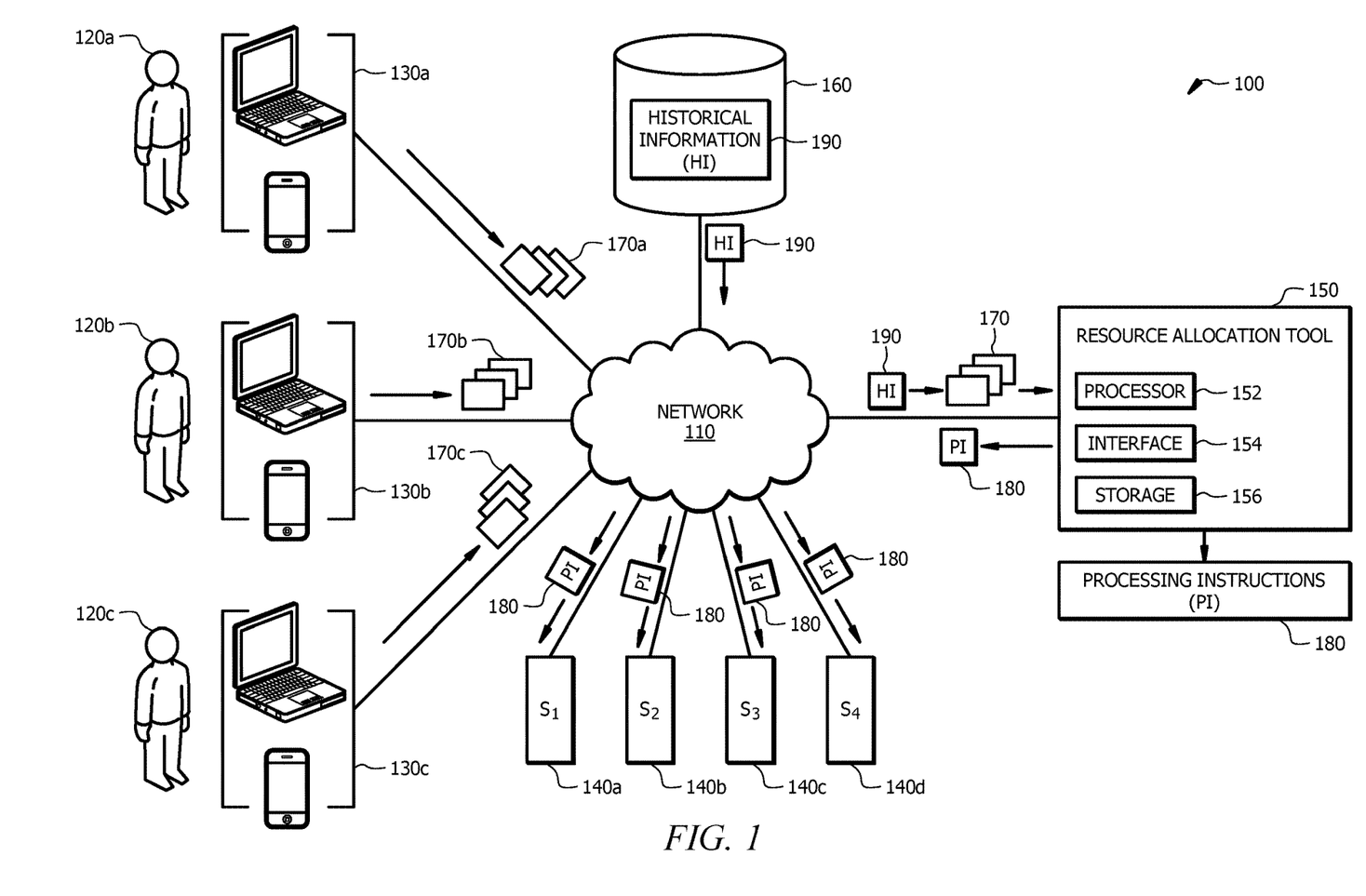
FIG. 1 is a block diagram illustrating a system for allocating resources of one or more servers using a resource allocation tool, according to certain embodiments.

FIG. 1 illustrates a system 100 for allocating resources of servers 120. As illustrated in FIG. 1, system 100 includes a network 110, one or more users 120, devices 130, one or more process servers 140, a resource allocation tool 150, and one or more databases 160. Generally, resource allocation tool 150 receives data processing requests 170 from users 120, develops a processing stack indicative of a queue for processing the data corresponding to data processing requests 170, and generates processing instructions 180 assigning slices of the processing stack to servers 140.

Network 110 may facilitate communication between and amongst components of system 100. This disclosure contemplates network 110 being any suitable network operable to facilitate communication between the components of system 100. For example, network 110 may permit users 120 to send data processing requests 170 to resource allocation tool 150 over network 110. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As described above, system 100 may include one or more users 120 in some embodiments. As depicted in FIG. 1, network 110 comprises three users 120a, 120b, and 120c. As is also depicted in FIG. 1, each user 120 is associated with one or more devices 130. For example, user 120a is associated with devices 130a, user 120b is associated with devices 130b and user 120c is associated with devices 130c. In some embodiments, users 120 use devices 130 to send data processing requests 170 over network 110. In some embodiments, data processing requests 170 comprise at least: data having a file size; an identification of a source of the data; and a priority indicator corresponding to the data. As an example, data processing request 170a may include a file that is 25 MB, identify the source of the file as user 120a, and include a priority indicator of 1. As will be explained in more detail below, the priority indicator indicates a preference of processing data associated with data processing request 170 and may be any suitable value. Priority indicator may be added to data processing request 170 by user 120, user device 130, and/or resource allocation tool 150. In some embodiments, user device 130 and/or resource allocation tool 150 determines a priority indicator based on the source of data processing request 170 (e.g., via a look-up table indicating sources and corresponding priority indicators).

This disclosure contemplates device 130 being any appropriate device that can communicate over network 110. For example, device 130 may be a computer, a laptop, a wireless or cellular telephone, an electronic notebook, a personal digital assistant, a tablet, a server, a mainframe, or any other device capable of receiving, processing, storing, and/or communicating information with other components of system 100. Device 130 may also include a user interface, such as a display, a microphone, keypad, or other appropriate terminal equipment usable by a user. In some embodiments, an application executed by device 130 may perform the functions described herein.

In some embodiments, system 100 further includes one or more servers 140 and one or more databases 160. Servers 140 may be configured to process data corresponding to data processing requests 170. As illustrated in FIG. 1, system 100 includes four servers 140a, 140b, 140c, and 140d. As will be explained in more detail below, servers 140 receive processing instructions 180 from resource allocation tool 150 and process data corresponding to data processing requests 170 per processing instructions 180. In some embodiments, processing instructions 180 include an identification of slices assigned to a particular server 140 for processing and an identification of the order in which to process such slices. Processing instructions 180 may be customized for a particular server 140 (e.g., server 140a receives processing instructions 180 intended only for server 140a) or be generalized in that processing instructions 180 include instructions for one or more other servers 140 (e.g., server 140a receives processing instructions 180 for server 140a, 140b, and 140c).

As illustrated in FIG. 1, system 100 includes one database 160. In some embodiments, database 160 is configured to store historical information 190. Historical information 190 may include one or more of: past information regarding resource availability (e.g., availability of servers 140 to process data) and past information related to data processing (e.g., data size, time, duration). In some embodiments, resource allocation tool uses historical information 190 to determine an optimal data size for each slice of a processing stack. As illustrated in FIG. 1, resource allocation tool 150 may receive historical information 190 over network 110.

System 100 also includes resource allocation tool 150 in some embodiments. As described above, resource allocation tool 150 is configured to receive data processing requests 170, establish a processing stack indicative of a queue for processing the data corresponding to data processing requests 170, and generate processing instructions 180 assigning slices of the processing stack to servers 140. Additional details regarding functionality of resource allocation tool 150 will be discussed below with respect to FIG. 2. In some embodiments, resource allocation tool 150 includes processing circuitry comprising hardware that is configured to execute software, which is in turn configured to perform the described functionality.

As illustrated in FIG. 1, resource allocation tool 150 includes a processor 152, an interface 154, and storage 156. In some embodiments, interface 154 is configured to permit resource allocation tool 150 to communicate with one or more components of network 110 (e.g., users 120, devices 130, databases 160, and servers 140). In some embodiments, interface 154 is configured to send and/or receive historical information 190, data processing requests 170, and/or processing instructions 180. Processor 152 may be configured to execute various algorithms implemented by various modules of resource allocation tool 150 (e.g., grouping engine 210, stacking engine 220, assignment engine 230, and error handling engine 240). These and other algorithms may be stored in storage 156. Although this disclosure describes and depicts resource allocation tool 150 comprising storage 156, this disclosure recognizes that resource allocation tool 150 may not include storage 156 in some embodiments. For example, storage 156 may be a stand-alone component or part of a component connected to network 110 and be accessible to resource allocation tool 150 via network 110. In some embodiments, resource allocation tool 150 may be a program executed by a computer system. As an example, resource allocation tool 150 may be executed by a computer such as computer 500 described below in reference to FIG. 5. In such example, storage 156 may be memory 520 and/or storage 530, processor 152 may be processor 510, and interface 154 may be I/O interface 540 and/or communication interface 550 of computer 500.

Figure 2:
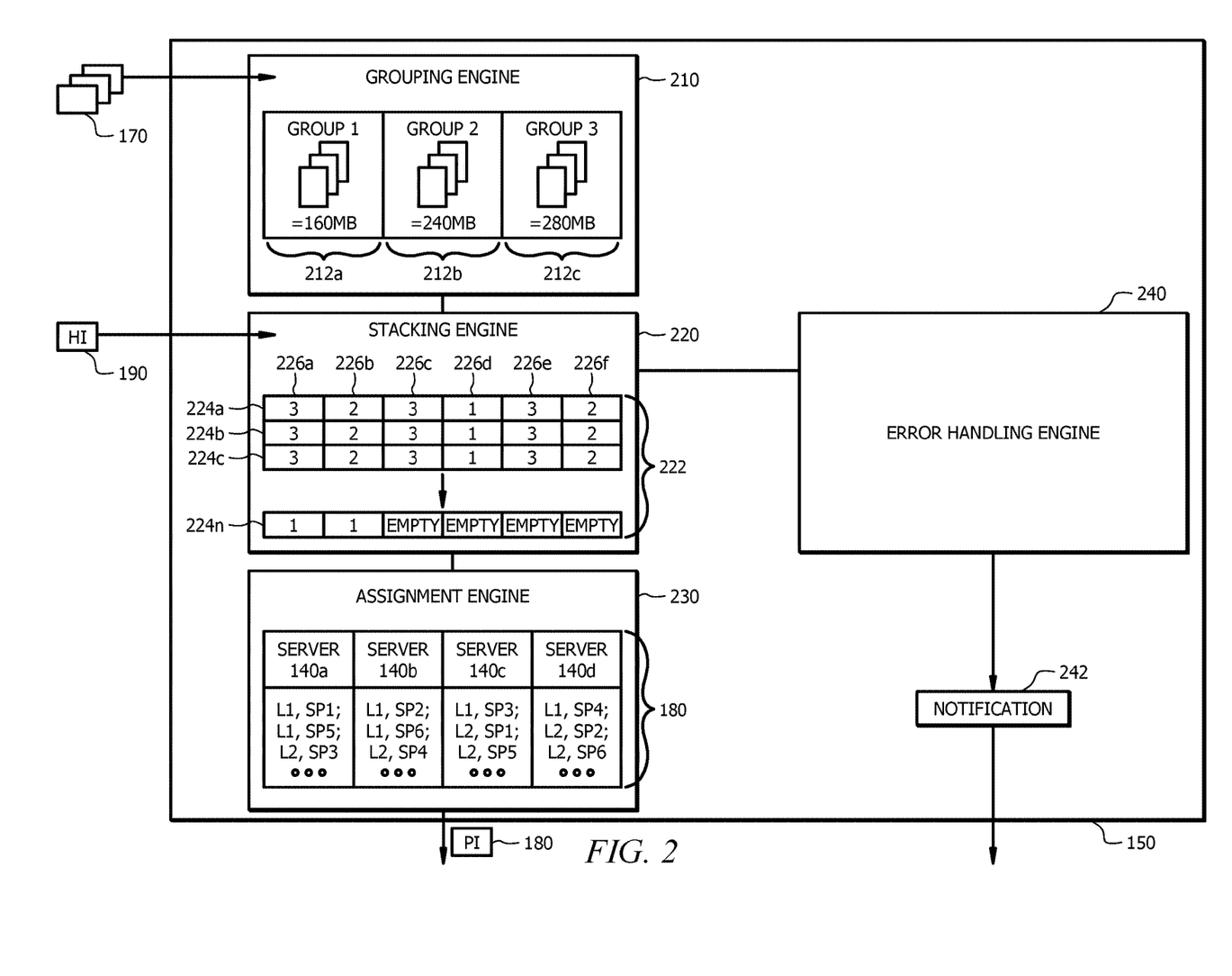
FIG. 2 is a block diagram illustrating the resource allocation tool of FIG. 1, according to certain embodiments.
Figure 3:
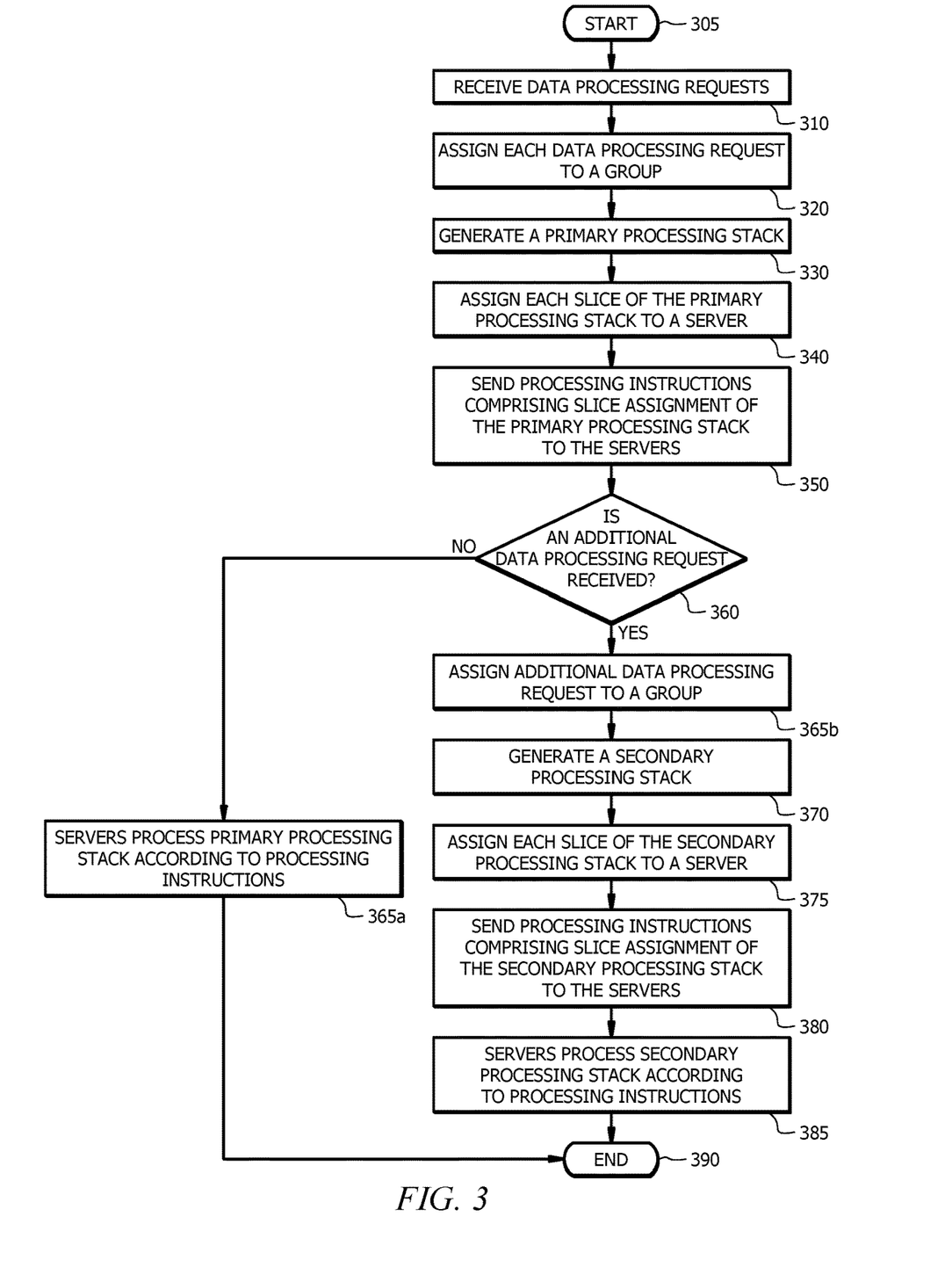
FIG. 3 is a flow chart illustrating a method for allocating resources of one or more servers using the resource allocation tool of FIG. 2, according to one embodiment of the present disclosure.
Figure 4:
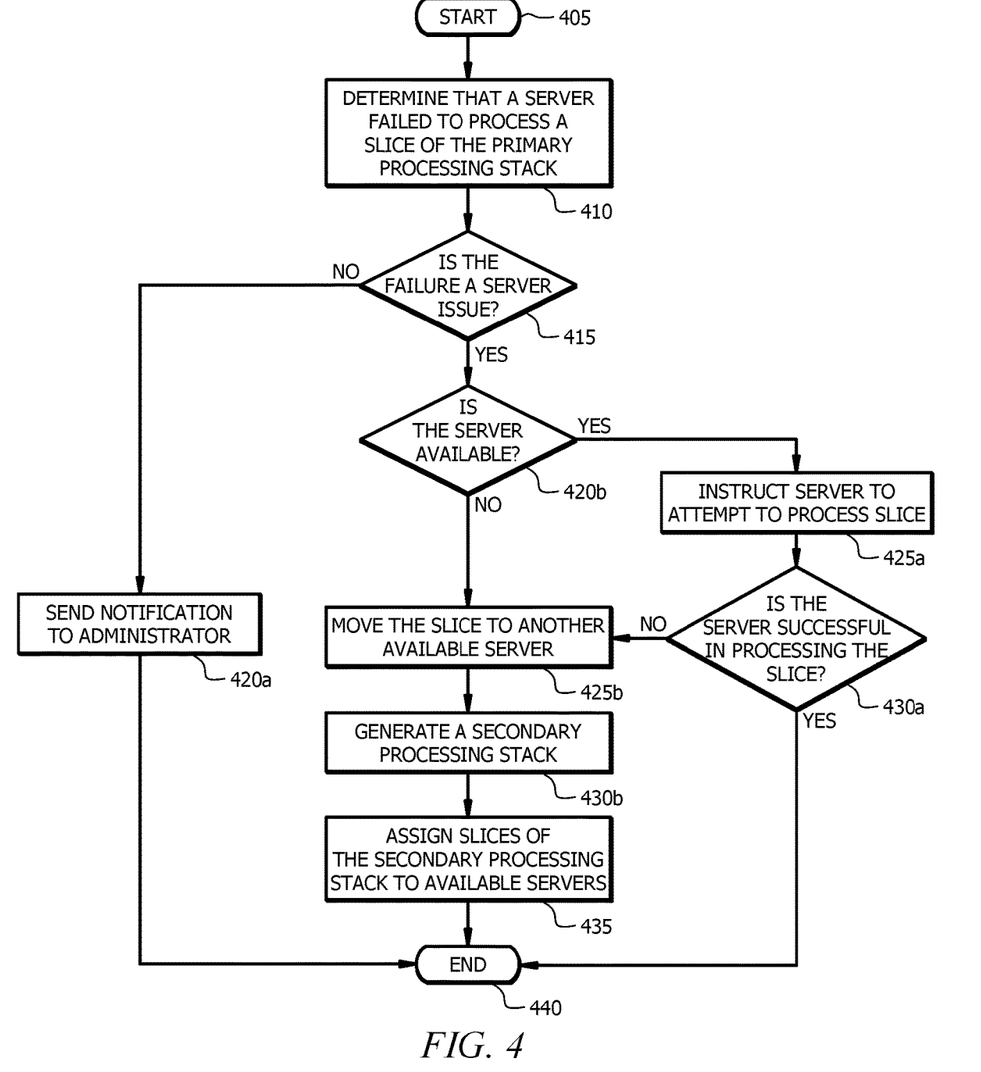
FIG. 4 is a flow chart illustrating method for allocating resources of one or more servers using the resource allocation tool of FIG. 2, according to another embodiment of the present disclosure.
Figure 5:
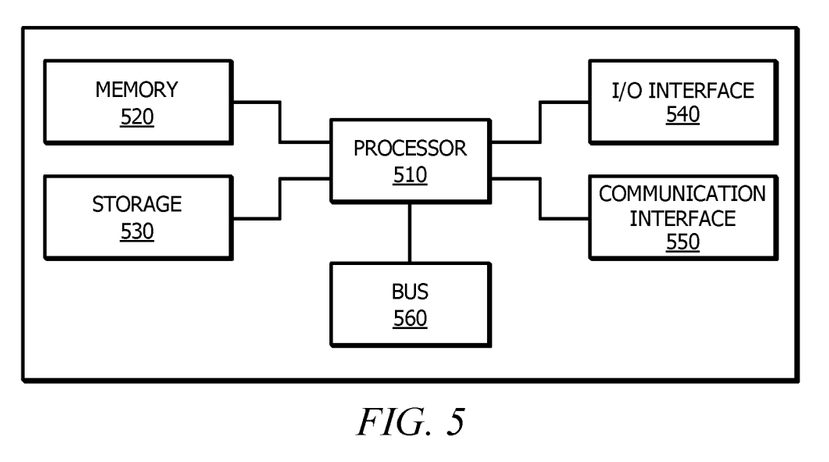
FIG. 5 is a block diagram illustrating a computer configured to implement the methods of FIGS. 3 and 4, according to certain embodiments.

Generally, FIG. 1 illustrates that resource allocation tool 150 receives one or more data processing requests 170 from users 120 via devices 130 and generates processing instructions 180 for servers 140 to handle the processing of data corresponding to the one or more data processing requests 170. FIG. 2 illustrates resource allocation tool 150 in greater detail and FIGS. 3 and 4 illustrates methods of allocating resources of servers 140 using resource allocation tool 150. Finally, FIG. 5 illustrates an example of a computer 500 that may be configured to run resource allocation tool 150.

As described above, resource allocation tool 150 receives one or more data processing requests 170 from devices 130 and generates processing instructions 180 for servers 140, the processing instructions 180 identifying at least (1) the slices assigned to a server 140 to process; and (2) a sequence in which to process the assigned slices. These and other functions of resource allocation tool 150 may be executed by one or more various modules of resource allocation tool 150. For example, as depicted in FIG. 2, resource allocation tool 150 may comprise a grouping engine 210, stacking engine 220, and assignment engine 230. In certain embodiments, resource allocation tool further comprises error handling engine 240. In some embodiments, engines 210, 220, 230 and 240 are executable software. In other embodiments, modules 210, 220, 230 and 240 are hardware. In yet other embodiments, modules 210, 220, 230 and 240 are a combination of software and hardware.

FIG. 2 illustrates a block diagram of resource allocation tool 150. As stated above, resource allocation tool 150 may include at least grouping engine 210, stacking engine 220, and assignment engine 230. In some embodiments, resource allocation tool 150 includes one or more engines such as error handling engine 240. Generally, grouping engine 210 is configured to assign data processing requests 170 to one or more groups 212, stacking engine 220 is configured to generate a processing stack 222 indicating a queue for processing the data associated with data processing requests 170, assignment engine 230 is configured to assign slices 226 of the processing stack 222 to one or more servers 140, and error handling engine 240 is configured to determine whether the servers 140 fail to process one or more slices 226 assigned to them. As discussed above, allocating resources of servers 140 using resource allocation tool 150 may permit data to be processed in a manner that aligns with an organization's goals (e.g., processing valuable and/or imperative data before less valuable and/or less imperative data).

Grouping engine 210 is configured to receive (e.g., via interface 154 of resource allocation tool 150) one or more data processing requests 170. Data processing requests 170 may be received from users 120 via one or more devices 130 over network 110. Each data processing request 170 may comprise or identify one or more of: data of a particular size, a source of the data, and a priority indicator corresponding to the data. As discussed above, the priority indicator may be added by user 120, device 130, and/or resource allocation tool 150. Priority indicator may also be added to data processing request 170 by any other suitable means (e.g., another component of system 100). Upon receipt of data processing requests 170, grouping engine 210 assigns each data processing request 170 to a group 212. As illustrated and described herein, grouping engine 210 assigns each data processing request 170 to one of three groups 212. In some embodiments, grouping engine 210 assigns a data processing request 170 to a group 212 based on the source of the data. As one example, data processing request 170a may be assigned to Group 1 (212a) because the request originated from user 120a who is an employee of Corporation A. As another example, data processing request 170b may be assigned to Group 2 (212b) because the request originated from device 130b and device 130b is associated with a particular business unit of Corporation A. As yet another example, data processing request 170c may be assigned to Group 3 (212c) because the request originated from user 120c who is a customer of Corporation C. Although this disclosure describes particular ways in which to assign data processing requests 170 to groups 212, this disclosure recognizes assigning data processing requests 170 to groups 212 in any suitable manner based on the source of each data processing request 170. Grouping engine 210 may be communicably coupled to stacking engine 220 such that grouping engine 210 may communicate the group assignment information to stacking engine 220.

Stacking engine 220 may use the group assignment information to generate a processing stack 222. As described above, each processing stack 222 may comprise one or more layers 224, which in turn may comprise one or more slices 226. As illustrated in FIG. 2, processing stack 222 includes four layers: 224a, 224b, 224c, and 224n. Each layer 224 includes six slices 226 designated by column as 226a, 226b, 226c, 226d, 226e, and 226f As used herein, a slice 226 refers to a portion of data to be processed by a process server 140. In some embodiments, slice 226 may comprise a portion of data corresponding to a particular data processing request 170 (e.g., slice 226 may include 10 MB of the 25 MB file from data processing request 170a). In other embodiments, slice 226 may comprise one or more portions of data corresponding to one or more data processing requests 170 (e.g., slice 226 may include a 5 MB file from data processing request 170b, a 3 MB file from data processing request 170e (not illustrated), and a 2 MB file from data processing request 170f (not illustrated)).

Generally, processing stack 222 represents a queue for processing the data included in data processing requests 170. As illustrated in FIG. 2, the first slice 226 in the queue is positioned in Layer 1 (224a), Slice Position 1 (226a) and the last slice 226 in the queue is positioned in Layer N (224$_n$), Slice Position 6 (226f). The number of layers 224 of processing stack 222 may depend on (1) the size of each slice 226; and (2) the number of slices 226 in each layer 224.

In some embodiments, stacking engine 220 determines the size of each slice 226 based on historical information 190. As discussed above, historical information 190 may include one or more of: past information regarding resource availability (e.g., availability of servers 140 to process data) and past information related to data processing (e.g., data size, time, duration). Based on historical information 190, stacking engine 220 may compute a slice size. As used herein, slice size refers to the size of a particular slice 226 (e.g., 10 MB). In some embodiments, slice size is computed based on a regression of historical information 190. As an example, slice size may be determined using the following formula: X=(Y–a)/b, wherein a and b are calculated as follows:

$$a = \frac{\sum Y - b \sum X}{N}$$

$$b = \frac{N \sum XY - (\sum X)(\sum Y)}{N \sum X^2 - (\sum X)^2}$$

and wherein X=Slice Size; Y=Time in hand to process; and N=count of historical observations.

The number of slices 226 within each layer 224 may be determined in any suitable manner. In some embodiments, the number of slices 226 in each layer 224 corresponds to the number of servers 140 in system 100 (e.g., processing stack 222 may include four (4) slices per layer because there are four (4) servers 140 in system 100). In some other embodiments, the number of slices 226 in each layer 224 corresponds to the number of available servers 140 in system 100 (e.g., processing stack 222 may include three (3) slices per layer because only three (3) of the four (4) servers 140 in system 100 are available). In yet other embodiments, the number of slices 225 in each layer 224 is equal to the sum of the number of servers 140 in system 100 and the number of groups 112 (e.g., processing stack 222 may include seven (7) slices per layer because there are four (4) servers 140 in system 100 and three (3) assignment groups 212).

Once stacking engine 220 determines the size of each slice 226 and the number of slices 226 in each layer 224, stacking engine 220 may determine the number of layers 226 needed to process processing stack 222. To determine the number of layers 226 for processing stack 222, stacking engine 220 may determine a total data processing size. The total data processing size may be calculated by summing together the aggregate file size per group 212. In some embodiments, the aggregate file size per group 212 is determined to be the sum of the size of the data that is included in each data processing request 170 assigned to each group 212. Thus, as an example, Group 1 (212a) may include five data processing requests 170 having an aggregate file size of 160 MB, wherein the first data processing request 170 includes data having a file size of 30 MB, the second data processing request 170 includes data having a file size of 5 MB, the third data processing request 170 includes data having a file size of 45 MB, the fourth data processing request 170 includes data having a file size of 20 MB, and the fifth data processing request 170 includes data having a file size of 60 MB. Stacking engine 220 may calculate aggregate file size for Group 2 (212b) and Group 3 (212b) similarly. For explanation purposes, this disclosure assumes that the aggregate file size for Group 2 (212b) is 240 MB and the aggregate file size for Group 3 (212c) is 280 MB. Based on the aggregate file sizes per group, stacking engine 220 may determine the total data processing size as 680 MB. Given that stacking engine 220 determined, according to FIG. 2, that each layer 225 includes six (6) slices and, assuming that each slice is 10 MB, stacking engine 220 may determine that processing stack 222 should include twelve layers 224.

After determining the constraints (e.g., slice size, slices per layer, and number of layers) of processing stack 222, stacking engine 220 may arrange the slices of processing stack 222 in a manner that indicates a processing sequence. In some embodiments, stacking engine 220 arranges the slices within processing stack 222 based on the priority indicator associated with underlying data to be processed. For example, stacking engine 220 may determine that data corresponding to data processing requests 170 assigned to Group 3 (212c) are associated with a priority indicator that has preference over data corresponding to data processing requests 170 assigned to Group 2 (212b) which may in turn be associated with a priority indicator different than the priority indicator associated with Group 3 (212c). Group 2 (212b) may further have preference over data corresponding to data processing requests assigned to Group 1 (212a) which may in turn be associated with a priority indicator different than the priority indicator associated with Group 2 (212b). In such an example, stacking engine 220 may determine that each layer 224 will consist of three (3) slices corresponding to data associated with Group 3 (212c), two (2) slices 226 corresponding to data associated with Group 2 (212b), and one (1) slice 226 corresponding to data associated with Group 1 (212a) unless and until the slices 226 associated with a particular group are exhausted. In other words, processing stack 222 may be organized as illustrated in TABLE 1 below and as partially illustrated in FIG. 2:

TABLE 1

|     | SP1 | SP2 | SP3 | SP4 | SP5 | SP6 |
| --- | --- | --- | --- | --- | --- | --- |
| L1 | Group 3: 1-10 MB | Group 2: 1-10 MB | Group 3: 11-20 MB | Group 1: 1-10 MB | Group 3: 21-30 MB | Group 2: 11-20 MB |
| L2 | Group 3: 31-40 MB | Group 2: 21-30 MB | Group 3: 41-50 MB | Group 1: 11-20 MB | Group 3: 51-60 MB | Group 2: 31-40 MB |
| L3 | Group 3: 61-70 MB | Group 2: 41-50 MB | Group 3: 71-80 MB | Group 1: 21-30 MB | Group 3: 81-90 MB | Group 2: 51-60 MB |
| L4 | Group 3: 91-100 MB | Group 2: 61-70 MB | Group 3: 101-110 MB | Group 1: 31-40 MB | Group 3: 111-120 MB | Group 2: 71-80 MB |
| L5 | Group 3: 121-130 MB | Group 2: 81-90 MB | Group 3: 131-140 MB | Group 1: 41-50 MB | Group 3: 141-150 MB | Group 2: 91-100 MB |
| L6 | Group 3: 151-160 MB | Group 2: 101-110 MB | Group 3: 161-170 MB | Group 1: 51-60 MB | Group 3: 171-180 MB | Group 2: 111-120 MB |
| L7 | Group 3: 181-190 MB | Group 2: 121-130 MB | Group 3: 191-200 MB | Group 1: 61-70 MB | Group 3: 201-210 MB | Group 2: 131-140 MB |
| L8 | Group 3: 211-220 MB | Group 2: 141-150 MB | Group 3: 221-230 MB | Group 1: 71-80 MB | Group 3: 231-240 MB | Group 2: 151-160 MB |
| L9 | Group 3: 241-250 MB | Group 2: 161-170 MB | Group 3: 251-260 MB | Group 1: 81-90 MB | Group 3: 261-270 MB | Group 2: 171-180 MB |
| L10 | Group 3: 271-280 MB | Group 2: 181-190 MB | Group 1: 91-100 MB | Group 2: 191-200 MB | Group 1: 101-110 MB | Group 2: 201-210 MB |
| L11 | Group 2: 211-220 MB | Group 2: 221-230 MB | Group 1: 111-120 MB | Group 2: 231-240 MB | Group 1: 121-130 MB | Group 1: 131-140 MB |
| L12 | Group 1: 141-150 MB | Group 1: 151-160 MB | EMPTY | EMPTY | EMPTY | EMPTY |

According to such processing stack, all data corresponding to data processing requests 170 assigned to Group 3 (212c) will be processed between Layers 1 and 10 (identified above as L1 and L10), all data corresponding to data processing requests 170 assigned to Group 2 (212b) will be processed between Layers 1 and 11 (identified above as L1 and L11), and all data corresponding to data processing requests 170 assigned to Group 1 (212a) will be processed between Layers 1 and 12 (identified above as L1 and L12). As illustrated above, one or more slice positions ("SP") within a layer 224 may be empty (see e.g., slice positions 3-6 of L12). This may occur, for example, when no additional data corresponding to data processing requests 170 requires slicing (e.g., when data from Group 1 (212a), Group 2 (212b), and Group 3 (212c) is exhausted).

In some embodiments, each layer 224 of processing stack 222 comprise at least one slice 226 associated with each group 212. In other embodiments, some layers 224 of processing stack 222 comprise at least one slice 226 associated with each group 212 (e.g., L1-L10 each comprise at least one slice from Group 1 (212a), Group 2 (212b), and Group 3 (212c)).

the sequence in which they appear within processing stack 222. For example, assignment engine 230 may assign slices of the exemplary processing stack 222 above as indicated in TABLE 2 below:

TABLE 2

| Server Assignments | | | |
|---|---|---|---|
| Server 140a | Server 140b | Server 140c | Server 140d |
| L1, SP1; L1, SP5; | L1, SP2; L1, SP6; | L1, SP3; L2, SP1; | L1, SP4; L2, SP2; |
| L2, SP3; L3, SP1; | L2, SP4; L3, SP2; | L2, SP5; L3, SP3; | L2, SP6; L3, SP4; |
| L3, SP5; L4, SP3; | L3, SP6; L4, SP4; | L4, SP1; L4, SP5; | L4, SP2; L4, SP6; |
| L5, SP1; L5, SP5; | L5, SP2; L5, SP6; | L5, SP3; L6, SP1; | L5, SP4; L6, SP2; |
| L6, SP3; L7, SP1; | L6, SP4; L7, SP2; | L6, SP5; L7, SP3; | L6, SP6; L7, SP4; |
| L7, SP5; L8, SP3; | L7, SP6; L8, SP4; | L8, SP1; L8, SP5; | L8, SP2; L8, SP6; |
| L9, SP1; L9, SP5; | L9, SP2; L9, SP6; | L9, SP3; L10, SP1; | L9, SP4; L10, SP2; |
| L10, SP3; L11, SP1; L11, SP5; | L10, SP4; L11, SP2; L11, SP6; | L10, SP5; L11, SP3; L12, SP1 | L10, SP6; L11, SP4; L12, SP2 |

Assignment engine 230 may use processing stack 222 to generate processing instructions 180. As described above, processing instructions 180 refer to slice assignment directives intended to guide servers 140 in their processing of data corresponding to data processing requests 170. Stated differently, processing instructions 180 instruct servers 140 about which data to process and the order in which to do so. In some embodiments, processing instructions 180 include an identification of slices assigned to a particular server 140 for processing and an identification of the sequence in which to process such slices. As illustrated in FIG. 2, assignment engine 230 assigns particular slices 226 of processing stack 222 to particular servers 140.

To determine which servers 140 to send processing instructions 180 to, assignment engine 230 may receive resource information. In some embodiments, resource information includes an identification of each server 140 in system 100, an indication of whether each server 140 in system 100 is available to process data, and a capacity of each server 140 in system 100. In some embodiments, assignment engine 230 may identify and send processing instructions 180 to all available servers 140. In other embodiments, assignment engine 230 may send processing instructions 180 only to those servers 140 having a processing capacity greater than the slice size determined by stacking engine 220.

In some embodiments, assignment engine 230 is configured to designate a server for handling the processing of each slice 226 of processing stack 222. Assignment of a slice 226 to a particular server 140 may be based on one or more of the layer 224 in which the slice 226 is located or the position of the slice 226 within a layer 224. For example, assignment engine 230 may assign each of the slices 226 in L1 to servers 140 before assigning any of the slices 226 in L2 to servers 140. Moreover, assignment engine 230 may indicate, via processing instructions 180, that servers 140 should prioritize the processing of slices 226 that appear in certain layers 224 and/or slice positions ("SP") of processing stack 222. For example, processing instructions 180 may indicate that server 140a process a Layer 1 ("L1"), Slice Position 1 ("SP1") slice before processing a L1, SP2 slice. As another example, processing instructions 180 may indicate that server 140b should process an L1, SP3 slice before processing a L2, SP2 slice.

In some embodiments, assignment engine 230 assigns slices 226 of processing stack 222 to servers 140 based on As shown above in TABLE 2, assignment engine 230 assigned each slice 226 to a server 140 based on its position within each slice of each layer 224. In other embodiments, assignment engine 230 may assign slices 226 to servers 140 solely based on layers 224 such that Server 140a is assigned all slices 226 in L1 and L5, Server 140b is assigned all slices 226 in L2 and L6, Server 140a is assigned all slices 226 in L3, and Server 140d is assigned all slices 226 in L4. In yet other embodiments, assignment engine 230 may assign slices 226 to servers 140 based on a combination of the above-described methods. Upon assigning slices 226 to one or more servers 140, assignment engine 230 may send slice assignments to servers 140. As explained above, assignment engine 230 may send the slice assignments for all servers 140 to each server 140 and/or send the slice assignments assigned to each server 140 to each respective server 140. In some embodiments, upon receiving the slice assignments, each server 140 may begin processing, in the order designated by processing instructions 180, the portion of data corresponding to each slice 226. By processing data according to the method described above, resources of servers 140 are allocated in a manner that complements an organization's objectives.

In some embodiments, resource allocation tool 150 may intervene with the processing of processing stack 222 reassign one or more slices 226 of processing stack 222 to a subsequently generated processing stack. This may be the case, for example, when grouping engine 210 receives one or more subsequent data processing requests 170. In some embodiments, resource allocation tool 150 generates a secondary processing stack in response to receiving subsequent data processing request 170. In other embodiments, resource allocation tool 150 generates a secondary processing stack in response to determining that subsequent data processing requests 170 include data associated with a particular priority indicator (e.g., a priority indicator greater than the lowest priority indicator associated with data from the original data processing requests 170). In some embodiments, stacking engine 220 is responsible for generating any subsequently generated processing stacks.

If resource allocation tool 150 determines that a secondary processing stack (identified hereafter as 222b) should be generated, resource allocation tool identifies a slice 226 of original processing stack (identified hereafter as 222a) that is: (1) currently being processed; and (2) is positioned closest to the final position of original processing stack 222a. For example, resource allocation tool 150 may query servers 140 for an identification of the slice 226 currently being processed by each server 140 and then determine, based on the identifications provided by servers 140, the slice 226 that is positioned nearest the final position (e.g., SP6 of L12) of original processing stack 222a. In some embodiments, resource allocation tool 150 determines which slices of original processing stack 222a to include in secondary processing stack 222b based on the layer in which the slice 226 nearest the final position resides. For example, if resource allocation tool 150 determines that L4, SP5 is the latest slice 226 in original processing stack 222a currently being processed, resource allocation tool may determine that all slices 226 located downstream the subsequent layer (e.g., L5-L12) be reassigned to secondary processing stack 222b. In such embodiment, servers 140 may continue processing slices 226 located in layers 224 upstream the subsequent layer (e.g., L5).

Stacking engine 220 may generate secondary processing stack 222b in a manner similar to that described above in reference to original processing stack 222a. Notably, however, the input for stacking engine 220 is different than described above. Rather than assigning all data processing requests 170 to a group 212, grouping engine 210 assigns only those data processing requests 170 corresponding to slices 226 located downstream the subsequent layer (e.g., slices 226 located in L5-L12) and subsequent data processing requests 170. Once these data processing requests 170 are assigned to groups, the grouping information may be communicated to stacking engine 220 which in turn generates secondary processing stack 222b upon determining slice size, slices per layer, and number of layers. These constraints may be determined in a manner similar to that described above in reference to original processing stack 222a. When generated correctly, secondary processing stack 222b includes the one or more slices 226 of original processing stack 222a that were located downstream the subsequent layer (e.g., slices 226 in L5-L12) and slices corresponding to data associated with subsequent data processing requests 170. Assignment engine 230 may receive data indicative of secondary processing stack 222b and assign, based on methods described above in reference to original processing stack 222a, each slice 226 of secondary processing stack 222b to a server 140 for processing.

In some embodiments, resource allocation tool 150 further comprises an error handling engine 240. Error handling engine 240 may be configured to identify errors and/or failures associated with the processing of slices 226 and take further action depending on the error/failure identified. For example, error handling engine 240 may be configured to determine whether the processing error is based on an issue with the underlying data of slice 226 or a server 140 processing the slice 226. If the error is based on the data being processed, error handling engine 240 may be configured to generate a notification 242 and send the notification 242 to one or more users associated with resource allocation tool 150 (e.g., an administrator of resource allocation tool 150). In some embodiments, the notification 242 indicates that the processing error is based on a data issue.

If the processing error is a server issue, however, error handling engine 240 may check whether the server 140 processing the slice-at-issue is available. If server 140 is available, error handling engine 240 may instruct the server 140 to reattempt processing of the slice-at-issue. In some embodiments, error handling engine 240 instructs the server 140 to reattempt processing of the slice-at-issue up to a particular number of times (e.g., three times) before taking further action. If the server 140 is successful in processing the slice-at-issue after an instruction to reattempt processing, the server 140 may proceed to process the next slice assigned to the server 140. If, however, the server 140 is not successful in processing the slice-at-issue after reattempting processing, error processing engine 240 may reassign the slice-at-issue to another server 140 for processing. In some embodiments, if error processing engine 240 reassigns the slice-at-issue to another server 140, resource allocation tool 150 is prompted to generate a new processing stack 222 and new processing instructions 180 to account for slices 226 assigned to the failed server 140 and the fact that failed server 140 is not working properly or is otherwise unavailable. The new processing stack 222 may be generated by stacking engine 220 based on new grouping information generated by grouping engine 210. In some embodiments, such grouping information includes group assignments for all slices 226 located in layers subsequent to the layer comprising the slice-at-issue. In some cases, error handling engine 140 generates and sends a notification 242 indicating an issue with the failed server 140 to one or more users 120 of resource allocation tool 150.

FIGS. 3 and 4 illustrate methods which may be performed by resource allocation tool 150. In some embodiments, some or all of the steps of methods 300 and 400 are performed by one or more engines of resource allocation tool 150. As explained above, the functionality prescribed to resource allocation tool 150 may be embodied in software that is executable by one or more processors. Generally, FIG. 3 describes a method by which resource allocation tool 150 generates an original processing stack 222a and then generates a secondary processing stack 222b in response to receiving subsequent data processing requests 170. In contrast FIG. 4 describe a method by which resource allocation tool 150 identifies errors or failures with the processing of a slice 226 of a processing stack 222 and takes action in response to such identification.

As illustrated in FIG. 3, the method 300 may begin in a step 305 and continue to a step 310. At step 310, resource allocation tool 150 receives one or more data processing requests 170. As described above, each data processing request 170 may include data having a file size; an identification of a source of the data; and a priority indicator corresponding to the data. Data processing requests 170 may be received over network 110 via device 130. In some embodiments, the engine of resource allocation tool 150 that receives data processing requests 170 is grouping engine 210. In some embodiments, after receiving data processing requests 170 at step 310, the method 300 continues to step 320.

At step 320, the resource allocation tool 150 assigns each data processing request 170 to a group 212. In some embodiments, the engine of resource allocation tool 150 responsible for assigning data processing requests 170 to groups 212 is grouping engine 210. In some embodiments, data processing requests 170 are assigned to groups 212 based on the source associated with each data processing request 170. After resource allocation tool 150 assigns each data processing request 170 to a group 212, the method 300 may continue to a step 330.

At step 330, resource allocation tool 150 generates a primary processing stack 222. Stacking engine 210 may be the engine of resource allocation tool 150 responsible for generating primary processing stack 222. As described above, a processing stack 222 is representative of a queue for processing the data associated with data processing requests 170. Primary processing stack 222 may include one or more layers 224, each of which include one or more slices 226, wherein each slice 226 corresponds to a portion of data associated with one of the data processing requests 170. In some embodiments, slices 226 within processing stack 222 are arranged based on the priority indicator associated with the underlying data. After resource allocation tool 150 generates primary processing stack 222, the method 300 may continue a step 340.

At step 340, resource allocation tool 150 assigns each slice 226 of primary processing stack 222 to a server 140. In some embodiments, the engine of resource allocation tool 150 that assigns slices 226 to servers 140 is assignment engine 230. As described above, resource allocation tool 150 may assign slices 226 to servers 140 based on one or more of an availability of each server 140 or a capacity of each server 140. After determining slice assignments, the method 300 may continue to a step 350.

At step 350, resource allocation tool 150 sends processing instructions 180 to one or more servers 140. In some embodiments, processing instructions 180 include an identification of slices 226 assigned to each server 140 and an identification of the sequence in which the server 140 is to process each slice 226. As described above, processing instructions 180 may be customized for a particular server 140 and/or be generalized to include directives for one or more servers 140. At a time subsequent to sending processing instructions 180, the method 300 proceeds to a step 360.

At step 360, resource allocation tool 150 determines whether it has received one or more additional data processing requests 170. In some embodiments, if resource allocation tool 150 has not received additional data processing requests 170, the method 300 proceeds to a step 365a in which the assigned servers 140 process the data corresponding to slices 226 according to processing instructions 180. If resource allocation tool 150 instead determines at step 360 that additional data processing requests 170 have been received, the method 300 may proceed to a step 365b in which resource allocation tool 150 assigns the additional data processing requests 170 to one or more groups 212. In some embodiments, the method 300 proceeds to a step 370 after completing step 365b.

At step 370, resource allocation tool 150 generates a secondary processing stack 222. In some embodiments, secondary processing stack 222 includes slices 226 corresponding to data associated with the additional data processing requests 170 determined to be received at step 360. Secondary processing stack 222 may further include any slices 226 remaining to be processed from primary processing stack 222. As described above, resource allocation tool 150 may determine slices remaining to be processed from primary processing stack 222. In some embodiments, the method 300 proceeds to a step 375 after completing step 370.

At step 375, resource allocation tool 150 may assign each slice 226 of secondary processing stack 222 to one or more servers 140. Slice assignment may be performed in a manner similar to that described above in reference to step 340. In some embodiments, after completing step 375, the method 300 proceeds to a step 380 wherein resource allocation tool 380 sends processing instructions 180 comprising the slice assignment determined at step 375 to one or more servers 140. Upon receiving the processing instructions 180 sent at step 375, the one or more servers 140 may process secondary processing stack 222 according to the processing instructions 180 sent at step 375. In some embodiments, upon completing steps 365a or 385, the method 300 may proceed to end step 390.

Turning now to FIG. 4, the method 400 describes a process wherein resource allocation tool 150 identifies an error during the processing of a slice 226. As illustrated in FIG. 4, the method 400 begins at a step 405 and proceeds to a step 410. At step 410, resource allocation tool 150 determines that a server 140 failed to process a slice 226 of a processing stack 222 (e.g., primary processing stack 222a). In some embodiments, error handling engine 240 is configured to perform step 410. Upon determining that server 140 failed to process a slice 226 of processing stack 222, the method 400 proceeds to a decision step 415. At step 415, resource allocation tool 150 determines whether the failure to process the slice-at-issue is due to an issue with server 140. If at step 415 resource allocation tool 150 determines that the failure is not due to an issue with server 140, the method 400 proceeds to a step 420a wherein resource allocation tool 150 sends a notification 242 to an administrator of resource allocation tool 150. In other embodiments, notification 242 is sent to some other user 120 or resource allocation tool 150. The method 400 may proceed to end step 440 upon sending such notification 242.

If, however, resource allocation tool 150 determines at step 415 that the failure is not due to an issue with server 140, the method 400 proceeds to a step 420b wherein resource allocation tool 150 determines whether the server 140 assigned to process the slice-at-issue is available. If the assigned server is available, the method 400 proceeds to a step 425a, wherein resource allocation tool 150 instructs the assigned server 140 to reattempt processing of the slice-at-issue. In some embodiments, step 425a repeats one or more times. After completing step 425a, resource allocation tool 150 determines whether the assigned server 140 was successful at processing the slice-at-issue. If the server was successful, the method 400 proceeds to end step 440. If, however, the server was not successful, the method 400 proceeds to step 425b which will be described in more detail below.

If resource allocation tool 150 determines at step 420b that the assigned server 140 is not available or at step 430a that the assigned server was not successful at processing the slice-at-issue, the method 400 proceeds to step 425b. At step 425b, resource allocation tool 150 reassigns the slice-at-issue to another server 140. In some embodiments, the server 140 to which the slice-at-issue is reassigned has an operational status and/or is otherwise available. After completing step 425b, the method 400 proceeds to a step 430b. At step 430b, resource allocation tool 150 generates a secondary processing stack 222b comprising at least the slices 226 of primary processing stack 222a that were not processed by servers 140. Upon completing step 430b, the method 400 may proceed to a step 435, wherein resource allocation tool 150 assigns each slice 226 of secondary processing stack 222b to one or more servers 140. In some embodiments, the servers 140 to which slices 226 of secondary processing stack 222b are assigned are operational or otherwise available. In some embodiments, resource allocation tool 150 does not assign any slices 226 of secondary processing stack 222b to the server that was unsuccessful at processing the slice-at-issue. The method 400 may then proceed to end step 440.

FIG. 5 illustrates an example of a computer system 500. As described above, resource allocation tool 150 may be a program that is implemented by a processor of a computer system such as computer system 500. Computer system 500 may be any suitable computing system in any suitable physical form. As an example and not by way of limitation, computer system 500 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

One or more computer systems 500 may perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As an example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

Computer system 500 may include a processor 510, memory 520, storage 530, an input/output (I/O) interface 540, a communication interface 550, and a bus 560 in some embodiments, such as depicted in FIG. 5. Although this disclosure describes and illustrates a particular computer system having a particular number of particular components in a particular arrangement, this disclosure contemplates any suitable computer system having any suitable number of any suitable components in any suitable arrangement.

Processor 510 includes hardware for executing instructions, such as those making up a computer program, in particular embodiments. For example, processor 510 may execute resource allocation tool 150 in some embodiments. As an example and not by way of limitation, to execute instructions, processor 510 may retrieve (or fetch) the instructions from an internal register, an internal cache, memory 520, or storage 530; decode and execute them; and then write one or more results to an internal register, an internal cache, memory 520, or storage 530. In particular embodiments, processor 510 may include one or more internal caches for data, instructions, or addresses. This disclosure contemplates processor 510 including any suitable number of any suitable internal caches, where appropriate. As an example and not by way of limitation, processor 510 may include one or more instruction caches, one or more data caches, and one or more translation lookaside buffers (TLBs). Instructions in the instruction caches may be copies of instructions in memory 520 or storage 530, and the instruction caches may speed up retrieval of those instructions by processor 510. Data in the data caches may be copies of data in memory 520 or storage 530 for instructions executing at processor 510 to operate on; the results of previous instructions executed at processor 510 for access by subsequent instructions executing at processor 510 or for writing to memory 520 or storage 530; or other suitable data. The data caches may speed up read or write operations by processor 510. The TLBs may speed up virtual-address translation for processor 510. In particular embodiments, processor 510 may include one or more internal registers for data, instructions, or addresses. This disclosure contemplates processor 510 including any suitable number of any suitable internal registers, where appropriate. Where appropriate, processor 510 may include one or more arithmetic logic units (ALUs); be a multi-core processor; or include one or more processors 510. Although this disclosure describes and illustrates a particular processor, this disclosure contemplates any suitable processor.

Memory 520 may include main memory for storing instructions for processor 510 to execute or data for processor 510 to operate on. As an example and not by way of limitation, computer system 500 may load instructions from storage 530 or another source (such as, for example, another computer system 500) to memory 520. Processor 510 may then load the instructions from memory 520 to an internal register or internal cache. To execute the instructions, processor 510 may retrieve the instructions from the internal register or internal cache and decode them. During or after execution of the instructions, processor 510 may write one or more results (which may be intermediate or final results) to the internal register or internal cache. Processor 510 may then write one or more of those results to memory 520. In particular embodiments, processor 510 executes only instructions in one or more internal registers or internal caches or in memory 520 (as opposed to storage 530 or elsewhere) and operates only on data in one or more internal registers or internal caches or in memory 520 (as opposed to storage 530 or elsewhere). One or more memory buses (which may each include an address bus and a data bus) may couple processor 510 to memory 520. Bus 560 may include one or more memory buses, as described below. In particular embodiments, one or more memory management units (MMUs) reside between processor 510 and memory 520 and facilitate accesses to memory 520 requested by processor 510. In particular embodiments, memory 520 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 520 may include one or more memories 520, where appropriate. Although this disclosure describes and illustrates particular memory, this disclosure contemplates any suitable memory.

Storage 530 may include mass storage for data or instructions. As an example and not by way of limitation, storage 530 may include a hard disk drive (HDD), a floppy disk drive, flash memory, an optical disc, a magneto-optical disc, magnetic tape, or a Universal Serial Bus (USB) drive or a combination of two or more of these. Storage 530 may include removable or non-removable (or fixed) media, where appropriate. Storage 530 may be internal or external to computer system 500, where appropriate. In particular embodiments, storage 530 is non-volatile, solid-state memory. In particular embodiments, storage 530 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 530 taking any suitable physical form. Storage 530 may include one or more storage control units facilitating communication between processor 510 and storage 530, where appropriate. Where appropriate, storage 530 may include one or more storages 530. Although this disclosure describes and illustrates particular storage, this disclosure contemplates any suitable storage.

I/O interface 540 may include hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 540 for them. Where appropriate, I/O interface 540 may include one or more device or software drivers enabling processor 510 to drive one or more of these I/O devices. I/O interface 540 may include one or more I/O interfaces 540, where appropriate. Although this disclosure describes and illustrates a particular I/O interface, this disclosure contemplates any suitable I/O interface.

Communication interface 550 may include hardware, software, or both providing one or more interfaces for communication (such as, for example, packet-based communication) between computer system 500 and one or more other computer systems 500 or one or more networks (e.g., network 110). As an example and not by way of limitation, communication interface 550 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 550 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 550 for any of these networks, where appropriate. Communication interface 550 may include one or more communication interfaces 550, where appropriate. Although this disclosure describes and illustrates a particular communication interface, this disclosure contemplates any suitable communication interface.

Bus 560 may include hardware, software, or both coupling components of computer system 500 to each other. As an example and not by way of limitation, bus 560 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 560 may include one or more buses 560, where appropriate. Although this disclosure describes and illustrates a particular bus, this disclosure contemplates any suitable bus or interconnect.

The components of computer system 500 may be integrated or separated. In some embodiments, components of computer system 500 may each be housed within a single chassis. The operations of computer system 500 may be performed by more, fewer, or other components. Additionally, operations of computer system 500 may be performed using any suitable logic that may comprise software, hardware, other logic, or any suitable combination of the preceding.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A resource allocation tool comprising:
a processor configured to implement a grouping engine, a stacking engine, and an assignment engine, wherein:
the grouping engine is configured to:
receive a plurality of data processing requests, each data processing request comprising:
first data having a file size; and
a priority indicator corresponding to the first data;
the stacking engine is configured to generate a primary processing stack indicating a queue for processing the first data associated with the plurality of data processing requests, wherein:
the primary processing stack comprises a plurality of layers;
each layer comprises a plurality of slices, wherein each slice represents a portion of the first data of at least one data processing request; and
the plurality of slices are arranged within each layer based at least on the priority indicator corresponding to the first data that each slice represents;
the assignment engine is configured to:
receive resource information about a plurality of servers, wherein:
each of the plurality of servers is configured to process the first data corresponding to each data processing request;
the resource information includes at least identification information and capacity information;
assign each slice of the primary processing stack to one or more of the servers having capacity based at least upon a position of the slice within the particular layer; and
send, to the one or more servers, processing instructions comprising an identification of each slice of the primary processing stack assigned to the respective server.

2. The resource allocation tool of claim 1, wherein:
the grouping engine is further configured to:
receive an additional data processing request subsequent to the stacking engine sending the processing instructions, the additional data processing request comprising:
second data having a file size; and
a priority indicator corresponding to the second data;
the stacking engine is further configured to generate a secondary processing stack indicating a queue for processing the first data associated with the plurality of data processing requests and the second data associated with the additional data processing request;
the assignment engine is further configured to:
assign each slice of the secondary processing stack to one or more of the servers having capacity; and
send, to the one or more servers, processing instructions comprising an identification of each slice of the secondary processing stack assigned to the respective server.

3. The resource allocation tool of claim 2, wherein the secondary processing stack is generated by:
determining, based at least on the slices being processed by the one or more servers having capacity, a layer of the primary stack being processed;
identifying, based at least on the layer of the primary stack being processed, one or more layers of the primary stack that have not been processed; and
determining, based at least on the one or more layers of the primary stack that have not been processed, a plurality of slices of the primary stack that remain to be processed;
wherein the secondary stack comprises at least the plurality of slices of the primary stack that remain to be processed.

4. The resource allocation tool of claim 1, wherein the stacking engine generates the primary processing stack by:
determining, based on historical data, a size for each slice of the primary processing stack; and
determining a number of slices within each layer.

5. The resource allocation tool of claim 4, wherein the plurality of slices are further arranged within each layer based on a total file size associated with each group, wherein the total file size associated with a group is calculated based on: identifying the file size of each first data assigned to each group; and summing together the identified file sizes.

6. The resource allocation tool of claim 1, wherein at least the first layer of the primary processing stack comprises at least one slice corresponding to each group.

7. The resource allocation tool of claim 1, further comprising an error handling engine implemented by the processor and configured to:
determine an occurrence of a processing error during the processing of an assigned slice, wherein determining the occurrence of the processor error comprises determining whether the processing error corresponds to a server issue or a data issue; and
send a notification indicative of the processing error to one or more users associated with the resource allocation tool.

8. The resource allocation tool of claim 7, wherein:
in response to determining that the processing error corresponds to a server issue, determine, based on the processing instructions, which of the plurality of servers failed to process the assigned slice;
determine whether the failed server has capacity;
if the failed server has capacity, instruct the failed server to re-process the assigned slice; and if the failed server cannot successfully process the assigned slice, reassign the assigned slice to a server other than the failed server.

9. The resource allocation tool of claim 8, wherein:
the stacking engine is further configured to generate a tertiary processing stack that comprises the assigned slice and a plurality of slices of the primary stack that remain to be processed;
the assignment engine is further configured to:
assign each slice of the tertiary processing stack to one or more servers other than the failed server; and
send, to each of the one or more servers other than the failed server, processing instructions comprising an identification of each slice of the tertiary processing stack assigned to the respective server.

10. A method comprising:
receiving a plurality of data processing requests, each data processing request comprising:
first data having a file size; and
a priority indicator corresponding to the first data;
generating a primary processing stack indicating a queue for processing the first data associated with the plurality of data processing requests, wherein:
the primary processing stack comprises a plurality of layers;
each layer comprises a plurality of slices, wherein each slice represents a portion of the first data of at least one data processing request; and
the plurality of slices are arranged within each layer based at least on the priority indicator corresponding to the first data that each slice represents;
receiving resource information about a plurality of servers, wherein:
each of the plurality of servers is configured to process the first data corresponding to each data processing request;
the resource information includes at least identification information and capacity information;
assigning each slice of the primary processing stack to one or more of the servers having capacity based at least upon a position of the slice within the particular layer; and
sending, to the one or more servers, processing instructions comprising an identification of each slice of the primary processing stack assigned to the respective server.

11. The method of claim 10, further comprising:
receiving an additional data processing request subsequent to sending the processing instructions, the additional data processing request comprising:
second data having a file size; and
a priority indicator corresponding to the second data;
generating a secondary processing stack indicating a queue for processing the first data associated with the plurality of data processing requests and the second data associated with the additional data processing request;
assigning each slice of the secondary processing stack to one or more of the servers having capacity; and
sending, to the one or more servers, processing instructions comprising an identification of each slice of the secondary processing stack assigned to the respective server.

12. The method of claim 11, wherein the secondary processing stack is generated by:
determining, based at least on the slices being processed by the one or more servers having capacity, a layer of the primary stack being processed;
identifying, based at least on the layer of the primary stack being processed, one or more layers of the primary stack that have not been processed; and
determining, based at least on the one or more layers of the primary stack that have not been processed, a plurality of slices of the primary stack that remain to be processed;
wherein the secondary stack comprises at least the plurality of slices of the primary stack that remain to be processed.

13. The method of claim 10, wherein the primary processing stack is generated by:
determining, based on historical data, a size for each slice of the primary processing stack; and
determining a number of slices within each layer.

14. The method of claim 10, further comprising:
determining an occurrence of a processing error during the processing of an assigned slice, wherein determining the occurrence of the processor error comprises determining whether the processing error corresponds to a server issue or a data issue; and
sending a notification indicative of the processing error.

15. The method of claim 14, further comprising:
in response to determining that the processing error corresponds to a server issue, determining, based on the processing instructions, which of the plurality of servers failed to process the assigned slice;
determining whether the failed server has capacity;
if the failed server has capacity, instructing the failed server to re-process the assigned slice; and
if the failed server cannot successfully process the assigned slice, reassigning the assigned slice to a server other than the failed server.

16. The method of claim 15, further comprising:
generating a tertiary processing stack that comprises the assigned slice and a plurality of slices of the primary stack that remain to be processed;
assigning each slice of the tertiary processing stack to one or more servers other than the failed server; and
sending, to each of the one or more servers other than the failed server, processing instructions comprising an identification of each slice of the tertiary processing stack assigned to the respective server.

17. One or more computer readable non-transitory storage media embodying software that is operable when executed to:
receive a plurality of data processing requests, each data processing request comprising:
first data having a file size; and
a priority indicator corresponding to the first data;
generate a primary processing stack indicating a queue for processing the first data associated with the plurality of data processing requests, wherein:
the primary processing stack comprises a plurality of layers;
each layer comprises a plurality of slices, wherein each slice represents a portion of the first data of at least one data processing request; and
the plurality of slices are arranged within each layer based at least on the priority indicator corresponding to the first data that each slice represents;
receive resource information about a plurality of servers, wherein:

each of the plurality of servers is configured to process the first data corresponding to each data processing request;

the resource information includes at least identification information and capacity information;

assign each slice of the primary processing stack to one or more of the servers having capacity based at least upon a sequence of the slice within the particular layer; and send, to the one or more servers, processing instructions comprising an identification of each slice of the primary processing stack assigned to the respective server.

18. The media of claim 17, further embodying software that is operable when executed to:

receive an additional data processing request subsequent to sending the processing instructions, the additional data processing request comprising:
  second data having a file size; and
  a priority indicator corresponding to the second data;

generate a secondary processing stack indicating a queue for processing the first data associated with the plurality of data processing requests and the second data associated with the additional data processing request;

assign each slice of the secondary processing stack to one or more of the servers having capacity; and send, to the one or more servers, processing instructions comprising an identification of each slice of the secondary processing stack assigned to the respective server.

19. The media of claim 17, further embodying software that is operable when executed to:

determine an occurrence of a processing error during the processing of an assigned slice, wherein determining the occurrence of the processor error comprises determining whether the processing error corresponds to a server issue or a data issue; and send a notification indicative of the processing error.

20. The method of claim 19, further embodying software that is operable when executed to:

in response to determining that the processing error corresponds to a server issue, determine, based on the processing instructions, which of the plurality of servers failed to process the assigned slice;

determine whether the failed server has capacity;

if the failed server has capacity, instruct the failed server to re-process the assigned slice; and if the failed server cannot successfully process the assigned slice, reassign the assigned slice to a server other than the failed server.

* * * * *